United States Patent
Petty

(10) Patent No.: US 10,184,358 B2
(45) Date of Patent: Jan. 22, 2019

(54) RETRACTABLE EXHAUST LINER SEGMENT FOR GAS TURBINE ENGINES

(71) Applicant: United Technologies Corporation, Hartford, CT (US)

(72) Inventor: Dale William Petty, Wallingford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 579 days.

(21) Appl. No.: 14/808,573

(22) Filed: Jul. 24, 2015

(65) Prior Publication Data

US 2016/0010507 A1   Jan. 14, 2016

Related U.S. Application Data

(63) Continuation of application No. 13/301,737, filed on Nov. 21, 2011, now Pat. No. 9,151,183.

(51) Int. Cl.

| | | |
|---|---|---|
| F01D 25/30 | (2006.01) | |
| F02K 1/82 | (2006.01) | |
| F02K 1/80 | (2006.01) | |

(52) U.S. Cl.
CPC ............ F01D 25/30 (2013.01); F02K 1/80 (2013.01); F02K 1/822 (2013.01); *F05D 2230/70* (2013.01); *F05D 2230/72* (2013.01); *F05D 2250/34* (2013.01); *F05D 2260/31* (2013.01);
(Continued)

(58) Field of Classification Search
USPC ..... 60/752–760, 770, 772, 779, 796; 244/54
See application file for complete search history.

(56) References Cited

U.S. PATENT DOCUMENTS

| | | |
|---|---|---|
| 4,000,854 A | 1/1977 | Konarski et al. |
| 4,175,385 A | 11/1979 | Nash |
| 4,411,134 A | 10/1983 | Moir |
| (Continued) | | |

FOREIGN PATENT DOCUMENTS

| | | |
|---|---|---|
| EP | 1995415 | 11/2008 |
| GB | 1103431 | 2/1968 |
| GB | 1116542 | 6/1968 |

OTHER PUBLICATIONS

European Search Report for European Patent Application No. 12193408 completed Nov. 1, 2016.

*Primary Examiner* — Arun Goyal
(74) *Attorney, Agent, or Firm* — Carlson, Gaskey & Olds, P.C.

(57) ABSTRACT

A retractable exhaust liner segment according to an example of the present disclosure includes, among other things, at least one liner segment extending between a forward end and an aft end. The forward end of the at least one liner segment is configured to overlap an aft end of an engine structure and the aft end of the at least one liner segment is configured to overlap a forward end of an exhaust liner when in an assembled position. The at least one liner is configured such that a gap exists between the at least one liner segment and one of the engine structure and the exhaust liner when the at least one liner segment is moved along an axis in a first direction to a disassembled position. The gap closes as the at least one liner segment is moved along the axis in a second, different direction to the assembled position.

23 Claims, 7 Drawing Sheets

(52) U.S. Cl.
CPC ........ *Y02T 50/675* (2013.01); *Y10T 29/49229* (2015.01)

(56) References Cited

U.S. PATENT DOCUMENTS

| | | | |
|---|---|---|---|
| 4,854,525 | A | 8/1989 | Chee |
| 5,031,836 | A | 7/1991 | Ward |
| 5,064,144 | A | 11/1991 | Chee |
| 5,390,877 | A | 2/1995 | Nightingale |
| 5,577,381 | A | 11/1996 | Eigenbrode et al. |
| 6,036,142 | A | 3/2000 | Yates |
| 7,770,292 | B2 | 8/2010 | Stretton |
| 8,402,765 | B2 * | 3/2013 | Amkraut ............ F02K 1/09 239/265.31 |
| 2006/0288688 | A1 * | 12/2006 | Lair ............ F02K 1/386 60/226.2 |
| 2008/0010969 | A1 * | 1/2008 | Hauer ............ B64D 29/02 60/204 |
| 2009/0064681 | A1 | 3/2009 | Keith et al. |
| 2011/0030338 | A1 * | 2/2011 | Vauchel ............ F02K 1/1261 60/226.2 |

\* cited by examiner

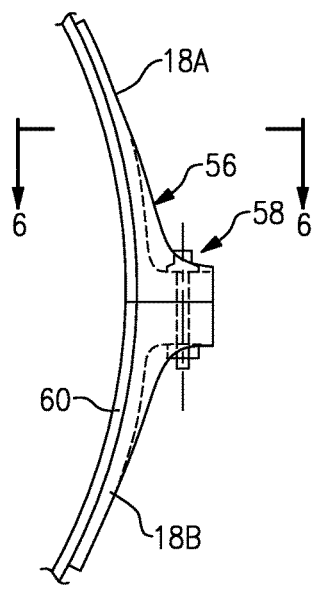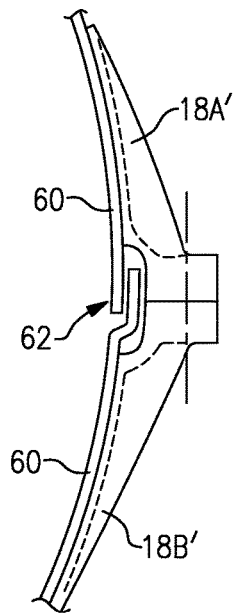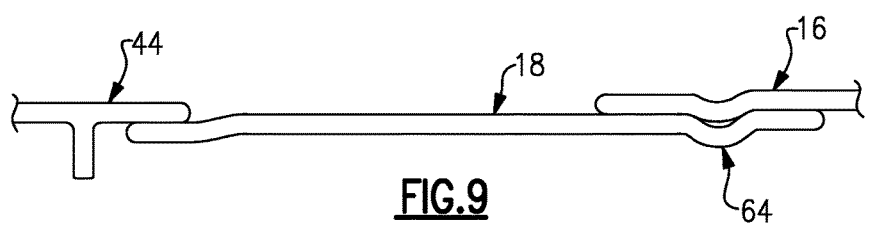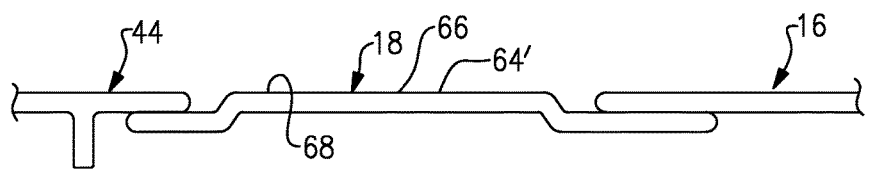

RETRACTABLE EXHAUST LINER SEGMENT FOR GAS TURBINE ENGINES

CROSS-REFERENCE TO RELATED APPLICATION

The present disclosure is a continuation of U.S. patent application Ser. No. 13/301,737, filed Nov. 21, 2011.

BACKGROUND

The present disclosure relates to gas turbine engines, and more particularly to an exhaust liner therefor.

Some environments require a propulsion system in which an engine or exhaust system may be dropped or raised from an airframe for maintenance within the shadow of the airframe.

SUMMARY

A retractable exhaust liner segment according to an example of the present disclosure includes at least one liner segment extending between a forward end and an aft end. The forward end of the at least one liner segment is configured to overlap an aft end of an engine structure and the aft end of the at least one liner segment is configured to overlap a forward end of an exhaust liner when in an assembled position. The at least one liner is configured such that a gap exists between the at least one liner segment and one of the engine structure and the exhaust liner when the at least one liner segment is moved along an axis in a first direction to a disassembled position. The gap closes as the at least one liner segment is moved along the axis in a second, different direction to the assembled position.

In a further embodiment of any of the forgoing embodiments, the at least one liner segment includes a first retractable exhaust liner segment and a second retractable exhaust liner segment arranged circumferentially about the axis.

A further embodiment of any of the foregoing embodiments includes a fastener assembly configured to mount a first flange of the first retractable exhaust liner segment to a second flange of the second retractable exhaust liner segment, wherein the fastener assembly includes a T-bolt.

A further embodiment of any of the foregoing embodiments includes a retainer to retain the T-bolt within the first flange.

In a further embodiment of any of the forgoing embodiments, the second flange includes a slot configured to receive the T-bolt pivotable through the slot.

In a further embodiment of any of the forgoing embodiments, the at least one liner segment includes a locating feature configured to axially index the at least one liner segment with respect to at least one of the engine structure and the exhaust liner when in the assembled position.

In a further embodiment of any of the forgoing embodiments, the locating feature defines a step surface configured to abut surfaces of at least one of the engine structure and the exhaust liner.

A propulsion system according to an example of the present disclosure includes a gas turbine engine along an axis, an exhaust liner along the axis, and a retractable exhaust liner segment configured to span between a portion of the gas turbine engine and the exhaust liner. The retractable exhaust liner segment is configured such that a gap exists between the retractable exhaust liner segment and one of the gas turbine engine and the exhaust liner when the retractable exhaust liner segment is moved along the axis in one direction to a disassembled position. The gap closes when the retractable exhaust liner segment is moved along the axis in another direction to an assembled position.

In a further embodiment of any of the forgoing embodiments, a forward end of the retractable exhaust liner segment is configured to overlap an aft end of the gas turbine engine and an aft end of the retractable exhaust liner segment is configured to overlap a forward end of the exhaust liner when the retractable exhaust liner segment is located in the assembled position.

In a further embodiment of any of the forgoing embodiments, the retractable exhaust liner segment includes a first segment and a second segment arranged circumferentially about the axis.

In a further embodiment of any of the forgoing embodiments, the retractable exhaust liner segment and the exhaust liner are mounted within an outer exhaust duct when in the assembled position. The outer exhaust duct is mountable to the gas turbine engine through an exhaust duct segment.

In a further embodiment of any of the forgoing embodiments, the retractable exhaust liner segment is configured to oppose relative movement between the portion of the gas turbine engine and the exhaust liner when the retractable exhaust liner segment is located in the assembled position.

In a further embodiment of any of the forgoing embodiments, the portion of the gas turbine engine is an engine tail cone configured to direct engine core flow to the exhaust liner.

In a further embodiment of any of the forgoing embodiments, the exhaust liner and the gas turbine engine are selectively received in an airframe configured to oppose axial movement of the exhaust liner and the gas turbine engine along the axis in a direction away from the retractable exhaust liner segment.

In a further embodiment of any of the forgoing embodiments, the gas turbine engine includes a compressor section, a combustor section and a turbine section.

In a further embodiment of any of the forgoing embodiments, the retractable exhaust liner segment includes a step surface configured to axially index the retractable exhaust liner segment with respect to at least one of the portion of the gas turbine engine and the exhaust liner when in the assembled position.

A method of maintaining a gas turbine engine according to an example of the present disclosure includes telescoping an exhaust liner segment along an axis over one of a gas turbine engine and an exhaust liner such that the exhaust liner segment defines a clearance gap between the other one of the gas turbine engine and the exhaust liner, and moving one of the gas turbine engine and the exhaust liner transverse to the axis and a distance through the clearance gap.

A further embodiment of any of the foregoing embodiments includes translating a forward end of the exhaust liner segment along the axis such that the forward end of the exhaust liner segment overlaps an aft end of the gas turbine engine.

A further embodiment of any of the foregoing embodiments includes translating an aft end of the exhaust liner segment along the axis such that the aft end of the exhaust liner segment overlaps a forward end of the exhaust liner.

In a further embodiment of any of the forgoing embodiments, the exhaust liner is selectively received within an outer exhaust duct, and moving one of the gas turbine engine and the exhaust liner transverse to the axis is performed vertically with respect to an airframe configured to receive the gas turbine engine, the exhaust liner, and the exhaust liner segment.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 7 is a side view of a flange of the retractable exhaust liner segment showing a fastener assembly according to one non-limiting embodiment;

FIG. 8 is a side view of a flange of the retractable exhaust liner segment according to another non-limiting embodiment;

FIG. 9 is a side view of a locating feature of the retractable exhaust liner segment according to one non-limiting embodiment;

FIG. 10 is a side view of a locating feature of the retractable exhaust liner segment according to another non-limiting embodiment;

DETAILED DESCRIPTION

Figure 1:
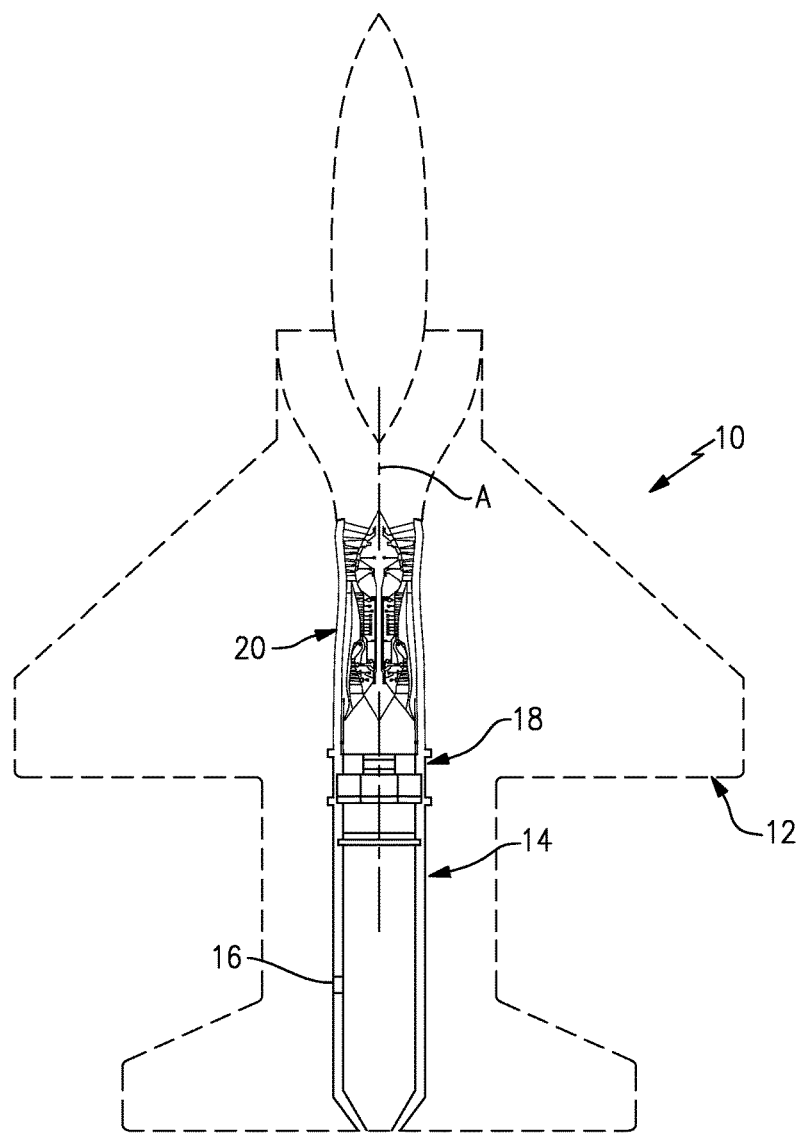
FIG. 1 is a general top perspective of an exemplary aircraft with a propulsion system for use with the present disclosure.

FIG. 1 schematically illustrates an aircraft 10. Some aircraft embed the engines within the vehicle planform to provide an effective balance of aero-performance, packaging, payload integration and survivability. The aircraft 10 in the disclosed non-limiting embodiment is schematically illustrated as a common air vehicle planform, however, it should be appreciated that any aircraft or vehicle will benefit herefrom and that the planform should not be considered limiting.

The aircraft 10 generally includes an airframe 12 and a propulsion system 14. The propulsion system 14 may be embedded within the airframe 12 and include an exhaust liner 16 and a gas turbine engine 20 along a central longitudinal engine axis A. The exhaust liner 16 and engine 20 are separately mounted within the airframe 12 and each is separately removable within the "shadow" of the airframe 12 via a retractable exhaust liner segment 18. That is, each may be removed and replaced vertically from the airframe 12 with respect to the ground rather than axially along the engine axis A. The retractable exhaust liner segment 18 selectively provides axial installation clearances to avoid damage to engine flanges yet assures a desired backpressure seal when installed.

Figure 2:
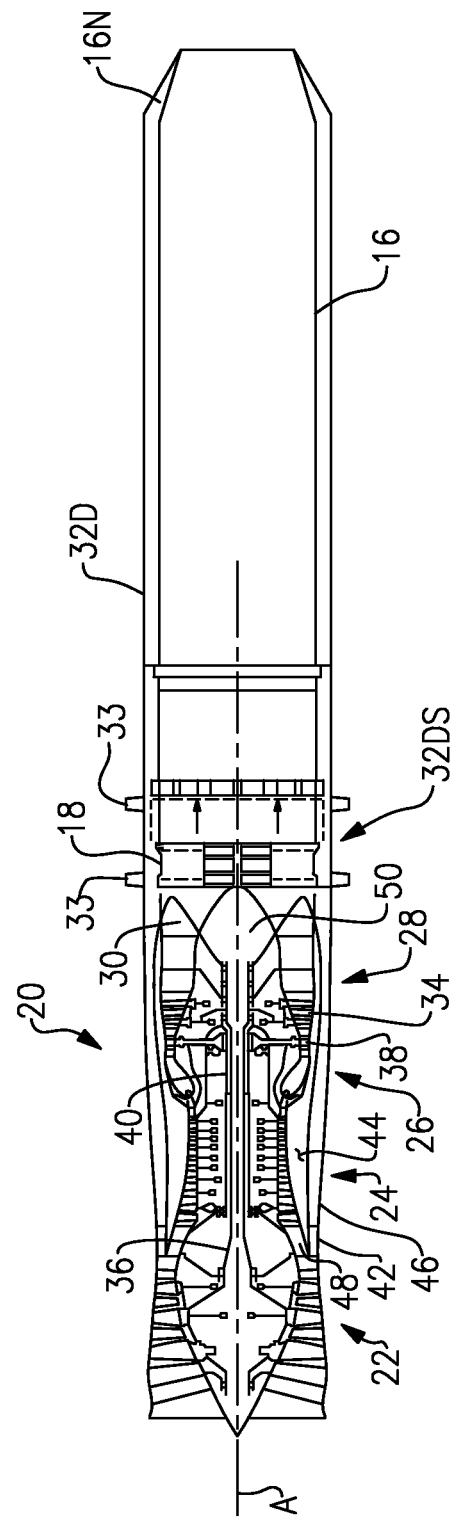
FIG. 2 is a general side sectional view of the propulsion system.

FIG. 2 schematically illustrates the exhaust liner 16 and the gas turbine engine 20. The exhaust liner 16 may be non-linear and/or transition to non-circular to suit airframe requirements. That is, the exhaust liner 16 may be contoured to at least partially extend off the axis A. The exhaust liner 16 may be of a linear or non-linear shape within an outer exhaust duct 32D and may include a nozzle section 16N. The nozzle section 16N may include various fixed, variable, convergent/divergent, two-dimensional and three-dimensional nozzle systems.

The gas turbine engine 20 is disclosed herein as a two-spool turbofan that generally incorporates a fan section 22, a compressor section 24, a combustor section 26, a turbine section 28, and an augmenter section 30. The sections are defined along the central longitudinal engine axis A. Although depicted as an augmented low bypass gas turbine engine in the disclosed non-limiting embodiment, it should be understood that the concepts described herein are applicable to other gas turbine engines including non-augmented engines, geared architecture engines, direct drive turbofans, turboshaft engines, three-spool architecture engines and others.

The compressor section 24, the combustor section 26 and the turbine section 28 are generally referred to as the engine core. The fan section 22 and a low pressure turbine 34 of the turbine section 28 are coupled by a first shaft 36 to define a low spool. The compressor section 24 and a high pressure turbine 38 of the turbine section 28 are coupled by a second shaft 40 to define a high spool.

An outer engine case structure 42 and an inner engine structure 44 define a generally annular secondary flow path 46 around a core flow path 48 of the engine core. It should be understood that various structure within the engine may define the outer engine case structure 42 and the inner engine structure 44 which essentially define an exoskeleton to support the core engine therein. It should be appreciated that the inner engine structure 44 as defined herein may include a turbine exhaust case, a stub liner, an augmenter liner, or any structure generally adjacent to an engine tail cone 50 and within the outer engine case structure 42 to direct the engine core flow.

Air which enters the fan section 22 is divided between a core flow through the core flow path 48 and a secondary flow through the secondary flow path 46. The core flow passes through the combustor section 26, the turbine section 28, then the augmentor section 30 where fuel may be selectively injected and burned to generate additional thrust through the exhaust liner section 32 and the exhaust liner 16. The secondary flow may be utilized for a multiple of purposes to include, for example, cooling and pressurization. The secondary flow as defined herein is any flow different from the primary combustion gas exhaust core flow.

The outer engine case structure 42 is mounted to the outer exhaust duct 32D via a removable or retractable exhaust duct segment 32Ds via, for example, V-band clamps 33 due to delta pressures an order of magnitude higher than the inner engine structure 44 and the exhaust liner 16. The exhaust duct segment 32Ds may be a split circumferentially in one or more places. That is, the duct segment 32Ds, in one disclosed non-limiting embodiment, includes a cylindrical member defined by a multiple of segments. It should be appreciated that rubber reinforced bellows or other seals may be utilized to permit some relative motion, yet still seal the exhaust duct segment 32Ds between the outer engine case structure 42 and the outer exhaust duct 32D. Once unclamped the bellows may be readily forced away for interior access to the exhaust liner segment 18. That is, the duct segment 32D provides a seal for the secondary flow and generally axially extends along a travel range of the retractable exhaust liner segment 18 (FIG. 3).

Figure 3:
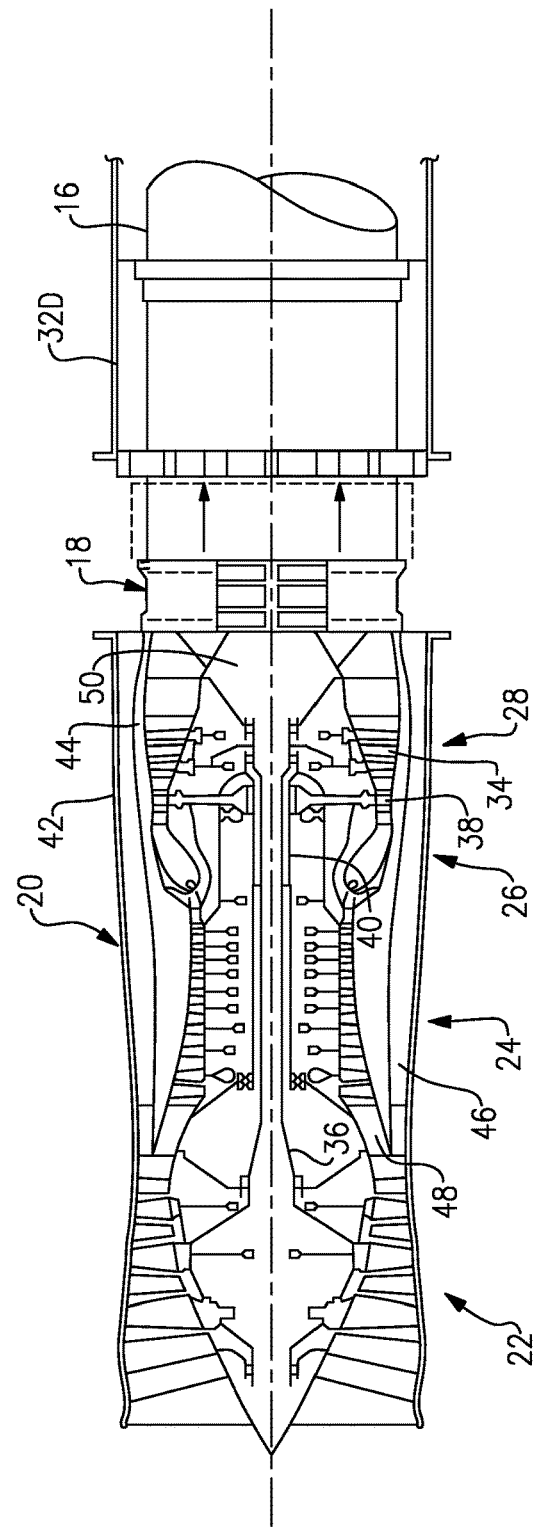
FIG. 3 is a general side sectional view of the propulsion system with a retractable exhaust liner segment in a closed position.
Figure 4:
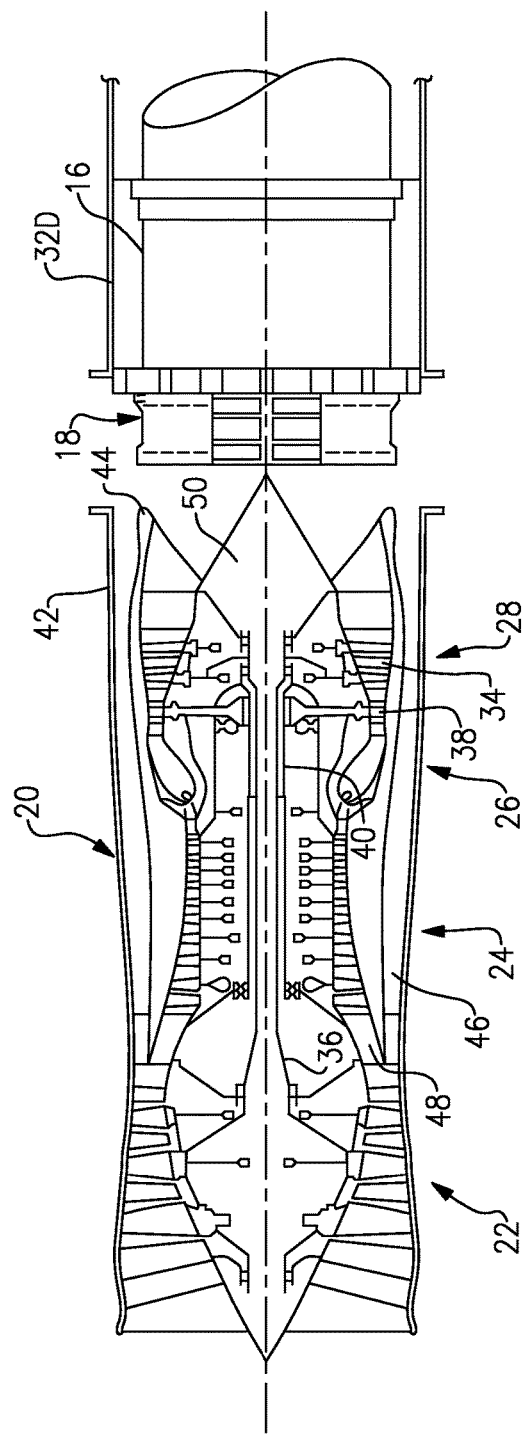
FIG. 4 is a general side sectional view of the propulsion system with a retractable exhaust liner segment in an open position.

The inner engine structure 44 is mounted to the exhaust liner 16 through the retractable exhaust liner segment 18 which may be loosened and then axially telescoped over either the inner engine structure 44 or the exhaust liner 16 along the axis A after removal or retraction of the duct segment 32D (FIG. 3). The retractable exhaust liner segment 18, in one disclosed non-limiting embodiment, provides clearance for the tail cone 50 for a straight vertical engine installation/removal movement transverse to the axis A (FIG. 4).

Figure 5:
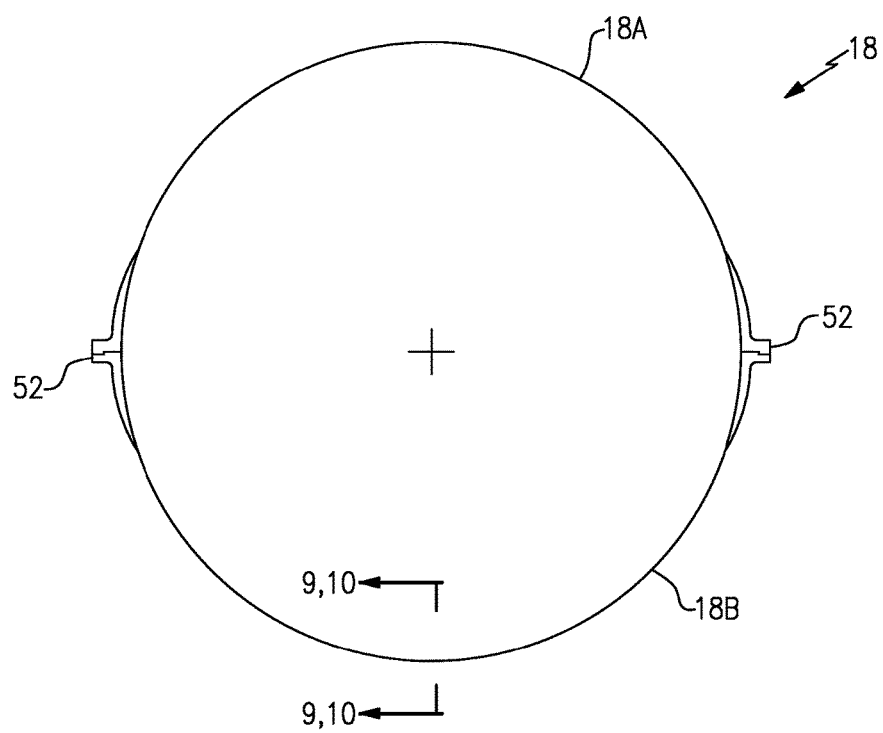
FIG. 5 is a side view of the retractable exhaust liner segment.

With reference to FIG. 5, the retractable exhaust liner segment 18 may be a split ring that is split circumferentially in one or more places (two segments 18A, 18B shown). That is, the retractable exhaust liner section 18 is essentially a cylindrical member defined by a multiple of segments.

Figure 6:
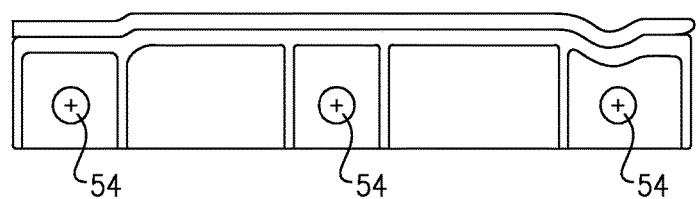
FIG. 6 is a plan view of a flange of the retractable exhaust liner segment.

A flange 52 is located at the interface of each segment 18A, 18B to define one or more fastener apertures 54 (FIG. 6). Each flange 52 may be further supported by a gusset 56 to receive a fastener assembly 58 such as a nut and bolt through the apertures 54. It should be appreciated that although two flanges 52 are illustrated for each segment 18A, 18B at a 180 degree displacement, it should be appreciate that only a single flange 52 may be utilized with radial flexing of the retractable exhaust liner segment 18 permitting movement thereof.

The retractable exhaust liner segment 18 may be manufactured of a nickel alloy base structure and a liner surface 60 coated with a high temperature ceramic material. It should be understood that any type of liner system such as a dual wall, single wall, cooled or uncooled will benefit herefrom. In another disclosed, non-limiting embodiment, the liner surface 60 defines a lap joint 62 adjacent to the interface between the segments 18A', 18B' (FIG. 8). The lap joint 62 further insulates the interface.

The retractable exhaust liner segment 18 includes a locating feature 64. The locating feature 64 may be an indentation or other undulation to axially index the retractable exhaust liner segment 18 with respect to the inner engine structure 44 and the exhaust liner 16. In another disclosed, non-limiting embodiment, the locating feature 64' defines a step surface 66 which provides an inner surface 68 which is generally parallel to the inner surfaces of the inner engine structure 44 and the exhaust liner 16 (FIG. 10).

Figure 12:
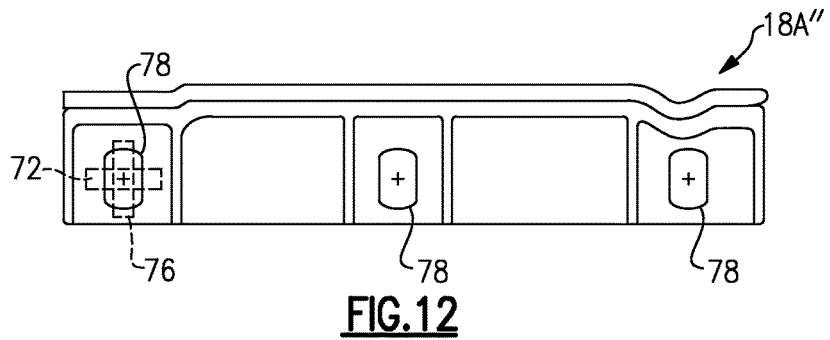
FIG. 12 is a plan view of a flange of one segment of the retractable exhaust liner segment of FIGS. 11.
Figure 11:
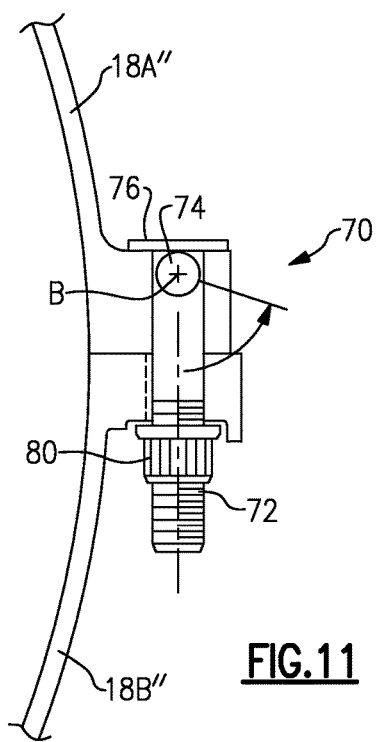
FIG. 11 is a side view of a flange of the retractable exhaust liner segment showing a fastener assembly according to another non-limiting embodiment.
Figure 13:
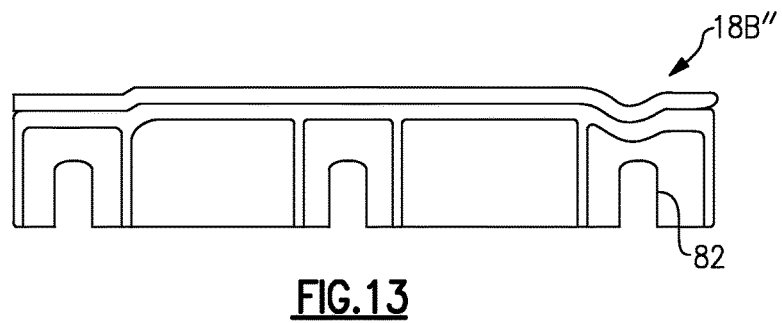
FIG. 13 is a plan view of a flange of one segment of the retractable exhaust liner segment of FIG. 11.

With reference to FIG. 11, another disclosed, non-limiting embodiment, includes a flange 70 that supports one or more captured fastener assemblies 72. Each captured fastener assembly 72 includes a T-Bolt 74 which is retained within one segment 18A' by a retainer 76. That is, the T-bolt 74 is pivotally retained within segment 18A'. Segment 18A' includes a slot 78 (FIG. 12) such that a nut 80 need only be loosened along the T-Bolt 74 then the T-bolt 74 pivoted along a bolt axis B through an open slot 82 in segment 18W' (FIG. 13) to assemble/disassemble segment 18B" from segment 18A" without any other separate components. This facilitates the reduction of Foreign Objet Damage (FOD).

With the best mode for carrying out the invention and the operation thereof having been described, certain additional features and benefits of the invention can now be more readily appreciated. For example, the retractable exhaust liner segment 18 facilitates tail cone clearance; provides a relatively uncomplicated design; eliminates seals and facilitates a selectively tight interface to provide backpressure and avoid wear from random vibrations.

It should be understood that relative positional terms such as "forward," "aft," "upper," "lower," "above," "below," and the like are with reference to the normal operational attitude of the vehicle and should not be considered otherwise limiting.

It should also be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A retractable exhaust liner segment comprising:
   at least one liner segment extending between a forward end and an aft end;
   wherein said forward end of said at least one liner segment is configured to overlap an aft end of an engine structure and said aft end of said at least one liner segment is configured to overlap and contact a forward end of an exhaust liner when in an assembled position, the aft end of the engine structure axially aft of a turbine section with respect to a central longitudinal axis, and the exhaust liner axially aft of the engine structure with respect to a central longitudinal axis; and
   wherein said at least one liner segment is configured such that an axial gap exists along said central longitudinal axis between said at least one liner segment and one of the engine structure and the exhaust liner when said at least one liner segment is moved along said central longitudinal axis in a first direction to a disassembled position, and the axial gap closes as said at least one liner segment is moved along the axis in a second, different direction to the assembled position.

2. The retractable exhaust liner segment as recited in claim 1, wherein said at least one liner segment includes a first retractable exhaust liner segment and a second retractable exhaust liner segment arranged circumferentially about said central longitudinal axis.

3. The retractable exhaust liner segment as recited in claim 1, wherein said at least one liner segment includes a locating feature configured to axially index said at least one liner segment with respect to at least one of the engine structure and the exhaust liner when in the assembled position.

4. The retractable exhaust liner segment as recited in claim 3, wherein said locating feature defines a step surface configured to abut surfaces of at least one of the engine structure and the exhaust liner.

5. The system as recited in claim 1, wherein said engine structure is an engine tail cone configured to direct engine core flow from said turbine section to said exhaust liner.

6. A retractable exhaust liner segment comprising:
at least one liner segment extending between a forward end and an aft end;
wherein said forward end of said at least one liner segment is configured to overlap an aft end of an engine structure and said aft end of said at least one liner segment is configured to overlap a forward end of an exhaust liner when in an assembled position;
wherein said at least one liner segment is configured such that a gap exists between said at least one liner segment and one of the engine structure and the exhaust liner when said at least one liner segment is moved along an axis in a first direction to a disassembled position, and the gap closes as said at least one liner segment is moved along the axis in a second, different direction to the assembled position;
wherein the aft end of the engine structure is axially aft of a turbine section with respect to the axis, and the exhaust liner is axially aft of the engine structure with respect to the axis;
wherein said at least one liner segment includes a first retractable exhaust liner segment and a second retractable exhaust liner segment arranged circumferentially about said axis; and
a fastener assembly configured to mount a first flange of said first retractable exhaust liner segment to a second flange of said second retractable exhaust liner segment, wherein said fastener assembly includes a T-bolt.

7. The retractable exhaust liner segment as recited in claim 6, further comprising a retainer to retain said T-bolt within said first flange.

8. The retractable exhaust liner segment as recited in claim 7, wherein said second flange includes a slot configured to receive said T-bolt pivotable through said slot.

9. A propulsion system comprising:
a gas turbine engine including a turbine section along a central longitudinal axis;
an exhaust liner along the central longitudinal axis;
a retractable exhaust liner segment configured to span between a portion of said gas turbine engine and said exhaust liner, said portion axially aft of said turbine section with respect to said central longitudinal axis, and said exhaust liner axially aft of said portion with respect to said central longitudinal axis; and
wherein said retractable exhaust liner segment is configured such that an axial gap exists along said central longitudinal axis between said retractable exhaust liner segment and one of said portion of said pas turbine engine and said exhaust liner when said retractable exhaust liner segment is moved along the central longitudinal axis in one direction to a disassembled position, and the axial gap closes when said retractable exhaust liner segment is moved along the central longitudinal axis in another direction to an assembled position.

10. The system as recited in claim 9, wherein a forward end of said retractable exhaust liner segment is configured to overlap an aft end of said gas turbine engine and an aft end of said retractable exhaust liner segment is configured to overlap and contact a forward end of said exhaust liner when said retractable exhaust liner segment is located in the assembled position.

11. The system as recited in claim 10, wherein said gas turbine engine includes a fan section, a compressor section and a combustor section, and said fan section is configured to deliver airflow to a core flow path and to a secondary flow path, and said turbine section defines said core flow path.

12. The system as recited in claim 9, wherein said retractable exhaust liner segment includes a first segment and a second segment arranged circumferentially about said central longitudinal axis.

13. The retractable exhaust liner segment as recited in claim 9, wherein said retractable exhaust liner segment and said exhaust liner are mounted within an outer exhaust duct when in the assembled position, said outer exhaust duct mountable to said gas turbine engine through an exhaust duct segment.

14. The system as recited in claim 13, wherein said retractable exhaust liner segment is configured to oppose relative movement between said portion of said gas turbine engine and said exhaust liner when said retractable exhaust liner segment is located in the assembled position.

15. The system as recited in claim 14, wherein said portion of said gas turbine engine is an engine tail cone configured to direct engine core flow to said exhaust liner.

16. The system as recited in claim 15, wherein said exhaust liner and said gas turbine engine are selectively received in an airframe configured to oppose axial movement of said exhaust liner and said gas turbine engine along the central longitudinal axis in a direction away from said retractable exhaust liner segment.

17. The system as recited in claim 14, wherein said gas turbine engine includes a compressor section and a combustor section.

18. The retractable exhaust liner segment as recited in claim 13, wherein said retractable exhaust liner segment include a step surface configured to axially index said retractable exhaust liner segment with respect to at least one of said portion of said gas turbine engine and said exhaust liner when in the assembled position.

19. A method of maintaining a gas turbine engine comprising:
telescoping an exhaust liner segment along a central longitudinal axis over one of a portion of a gas turbine engine and a portion of an exhaust liner such that said exhaust liner segment defines an axial clearance gap along the central longitudinal axis between other one of said gas turbine engine and said exhaust liner, said portion of said gas turbine engine axially aft of a turbine section with respect to said central longitudinal axis, and said exhaust liner axially aft of said portion with respect to said central longitudinal axis; and
moving one of said portion of said gas turbine engine and said portion of said exhaust liner transverse to the central longitudinal axis a distance through said axial clearance gap.

20. The method as recited in claim 19, comprising translating a forward end of said exhaust liner segment along the central longitudinal axis such that said forward end of said exhaust liner segment overlaps said portion of said gas turbine engine.

21. The method as recited in claim 19, comprising translating an aft end of said exhaust liner segment along the central longitudinal axis such that said aft end of said exhaust liner segment overlaps and contacts a forward end of said exhaust liner.

22. The method as recited in claim 19, wherein said exhaust liner is selectively received within an outer exhaust duct, and moving one of said gas turbine engine and said exhaust liner transverse to the central longitudinal axis is performed vertically with respect to an airframe configured to receive said gas turbine engine, said exhaust liner, and said exhaust liner segment.

23. The method as recited in claim 19, wherein said turbine section includes a first turbine and a second turbine.

\* \* \* \* \*

UNITED STATES PATENT AND TRADEMARK OFFICE
CERTIFICATE OF CORRECTION

PATENT NO. : 10,184,358 B2
APPLICATION NO. : 14/808573
DATED : January 22, 2019
INVENTOR(S) : Dale William Petter It is certified that error appears in the above-identified patent and that said Letters Patent is hereby corrected as shown below:

In the Claims

In Claim 9, Column 7, Line 55; replace "said pas turbine" with --said gas turbine--

Signed and Sealed this
Twenty-fourth Day of October, 2023

Katherine Kelly Vidal
*Director of the United States Patent and Trademark Office*